United States Patent
Sadri et al.

(10) Patent No.: US 8,482,295 B2
(45) Date of Patent: Jul. 9, 2013

(54) ELECTROMAGNETIC BATH LEVEL MEASUREMENT FOR PYROMETALLURGICAL FURNACES

(75) Inventors: Afshin Sadri, Woodbridge (CA); Ehsan Shameli, Mississauga (CA); Bert O. Wasmund, Mississauga (CA); Nils W. Voermann, Mississauga (CA)

(73) Assignee: Hatch Ltd., Mississauga (CA)

( * ) Notice: Subject to any disclaimer, the term of this patent is extended or adjusted under 35 U.S.C. 154(b) by 362 days.

(21) Appl. No.: 12/709,949

(22) Filed: Feb. 22, 2010

(65) Prior Publication Data

US 2010/0213922 A1    Aug. 26, 2010

Related U.S. Application Data

(60) Provisional application No. 61/154,448, filed on Feb. 23, 2009.

(51) Int. Cl.
*G01R 27/04* (2006.01)
*G01R 27/32* (2006.01)

(52) U.S. Cl.
USPC ........... 324/637; 342/124; 375/376; 324/204; 73/304 C; 73/290 R; 73/615; 164/154.2; 266/94

(58) Field of Classification Search
USPC ........................................... 324/637; 73/615
See application file for complete search history.

(56) References Cited

U.S. PATENT DOCUMENTS

| | | | | |
|---|---|---|---|---|
| 3,537,505 A | | 11/1970 | Thalmann et al. | |
| 4,359,211 A | * | 11/1982 | Baumert | 266/99 |
| 4,529,029 A | * | 7/1985 | Block | 164/451 |
| 4,788,444 A | * | 11/1988 | Williams | 250/577 |
| 4,816,758 A | * | 3/1989 | Theissen et al. | 324/204 |
| 4,833,918 A | | 5/1989 | Jean et al. | |
| 4,859,940 A | * | 8/1989 | Hummert et al. | 324/204 |
| 5,115,242 A | * | 5/1992 | Nagamune et al. | 342/124 |
| 5,148,177 A | | 9/1992 | Nagamune et al. | |

(Continued)

FOREIGN PATENT DOCUMENTS

| CA | 2155682 C | 8/1994 |
|---|---|---|
| CA | 2329954 A1 | 3/2003 |

(Continued)

OTHER PUBLICATIONS

Extended European Search Report dated Jul. 7, 2012 (issued in corresponding European Patent Application No. 10743384.9).

*Primary Examiner* — Melissa Koval
*Assistant Examiner* — Benjamin M Baldridge
(74) *Attorney, Agent, or Firm* — Bereskin&Parr LLP/S.E.N.C.R.L., s.r.l.

(57) ABSTRACT

Systems and methods for measuring the level of a plurality of phases of a conductive or semi-conductive mixture in a vessel. The systems and method include a vessel configured to hold the mixture, a plurality of antennas configured to transmit electromagnetic and/or eddy current signals into the mixture to impinge upon the plurality of phases and to receive corresponding signals reflected from the plurality of phases, a transmitter module configured to generate electromagnetic and/or eddy current signals in communication with the plurality of antennas, a receiver module configured to receive electromagnetic and/or eddy current signals in communication with the plurality of antennas, a control module in communication with the transmitter module and the receiver module configured to control their operation, and a signal analysis module in communication with the receiver module configured to process the reflected signals to determine the levels of the plurality of phases within the vessel.

28 Claims, 8 Drawing Sheets

U.S. PATENT DOCUMENTS

| | | | |
|---|---|---|---|
| 5,351,036 A | 9/1994 | Brown et al. | |
| 5,581,191 A * | 12/1996 | Yamaguchi | 324/637 |
| 5,629,706 A | 5/1997 | Baath | |
| 5,781,008 A * | 7/1998 | Muller et al. | 324/230 |
| 5,789,675 A * | 8/1998 | Blaine et al. | 73/290 R |
| 5,832,772 A * | 11/1998 | McEwan | 73/290 R |
| 6,130,637 A * | 10/2000 | Meszaros et al. | 342/124 |
| 6,166,681 A | 12/2000 | Meszaros et al. | |
| 6,255,983 B1 | 7/2001 | Meszaros et al. | |
| 6,309,442 B1 * | 10/2001 | Usher | 75/386 |
| 6,836,734 B2 * | 12/2004 | Rojas et al. | 702/33 |
| 7,367,226 B2 * | 5/2008 | Okamura | 73/64.55 |
| 7,486,226 B2 * | 2/2009 | Edvardsson | 342/118 |
| 7,509,856 B1 * | 3/2009 | Winkens et al. | 73/304 C |
| 2003/0209846 A1 * | 11/2003 | Rojas et al. | 266/265 |
| 2003/0212501 A1 * | 11/2003 | Rojas et al. | 702/33 |
| 2004/0169502 A1 | 9/2004 | Julius | |
| 2005/0133192 A1 * | 6/2005 | Meszaros et al. | 164/459 |
| 2005/0156607 A1 * | 7/2005 | Okamura | 324/639 |
| 2007/0000321 A1 * | 1/2007 | Boudaoud et al. | 73/304 R |
| 2007/0062334 A1 * | 3/2007 | Barriga et al. | 75/386 |
| 2007/0101809 A1 * | 5/2007 | Roesner | 73/290 R |
| 2007/0109177 A1 | 5/2007 | Baath et al. | |
| 2007/0236385 A1 * | 10/2007 | Kleman et al. | 342/124 |
| 2008/0143587 A1 * | 6/2008 | Johnson | 342/25 R |
| 2008/0184795 A1 * | 8/2008 | Woodard | 73/304 C |
| 2009/0158841 A1 * | 6/2009 | Winkens | 73/304 C |
| 2011/0109496 A1 * | 5/2011 | Van Den Berg | 342/124 |

FOREIGN PATENT DOCUMENTS

| | | |
|---|---|---|
| EP | 0060800 A1 | 9/1982 |
| EP | 0444834 A2 | 9/1991 |
| EP | 0449590 A2 | 10/1991 |
| EP | 0451987 A2 | 10/1991 |
| EP | 0554895 A1 | 8/1993 |
| EP | 0979696 A1 | 2/2000 |
| FR | 2816403 A1 | 5/2002 |
| WO | 00/11494 A1 | 3/2000 |
| WO | 03/027334 A1 | 4/2003 |
| WO | 2005062846 A2 | 7/2005 |
| WO | 2006/103201 A1 | 10/2006 |

* cited by examiner

ELECTROMAGNETIC BATH LEVEL MEASUREMENT FOR PYROMETALLURGICAL FURNACES

FIELD

The described embodiments relate to electromagnetic bath level measurement. More specifically, the described embodiments relate to electromagnetic bath level measurement of a plurality of phases of a conductive or semi-conductive mixture contained within a vessel.

BACKGROUND

The production of metals such as iron, nickel, copper, aluminum, lead, cobalt and platinum is typically done through smelting the concentrated ores in several smelting and purification processes. Impure and low ore pellets that are introduced into the pyrometallurgical furnace are commonly referred to as concentrates. Ore contained within the concentrates is often oxidized and mixed with silicates, other metals and other impurities. When the concentrates are exposed to high temperatures during smelting, these impurities are separated from the desired molten metallic phase and can be removed by tapping or by other techniques.

The desired molten metallic phase is known as the metal or matte phase while the impurities form a slag phase. The density of the matte phase is generally higher than the slag phase. This difference in density allows for the separation of the slag and matte phases as the slag tends to float atop the molten matte phase. The boundary between the molten matte phase and the slag is commonly referred to as the matte/slag interface.

From both a production and economic point of view it is desirable to determine the location of the matte/slag interface level. The speed and economy of production is affected by accurate knowledge of matte and slag volumes and levels in a furnace as the decision to tap the slag and matte is based on the levels of each phase within the furnace. Reliable and accurate measurement of the matte/slag interface level contributes to better overall control of the smelting process. Moreover, knowledge of the interface level is important for the structural integrity of the furnace and contributes to the design process.

Currently, several techniques are available to measure the levels of the matte and slag phases in a furnace. These techniques include the use of sounding bars, bath level predictors and microwave sensors.

Using a sounding bar is a well known technique and involves dipping a steel rod directly into the furnace bath. Differences in the way the matte and slag phases react with the rod are used to estimate the position of the slag/matte interface. This technique suffers from accuracy and repeatability problems and is prone to human error.

A bath level predictor uses process information such as feed rate, metal production and tapping information to estimate the levels within the furnace based on a mathematical algorithm. This is an indirect measurement and depends on accurate process information as well as regular calibration.

Another known method uses a microwave system to estimate the thickness of the slag phase using a transmitter and receiver located on the roof, or top surface, of the furnace. Microwave signals are transmitted from above and reflected from the slag phase and the matte phase. In practice however, the high conductivity of the slag phase prevents effective penetration of the microwave signals to the slag/matte interface from above. Microwave signals returned to the detector from the slag/matte interface tend to be significantly attenuated and as a result, accurate measurements of the level of the interface are difficult to achieve.

SUMMARY

In a first aspect, the present invention provides a method of measuring the level of a phase from a plurality of phases of a conductive or semi-conductive mixture within a vessel. The method includes: providing a vessel containing a conductive or semi-conductive mixture including a plurality of phases, the vessel comprising a sidewall; transmitting at least one electromagnetic and/or eddy current signal into the vessel sidewall at a plurality of different levels so that each of the transmitted electromagnetic and/or eddy current signals impinges upon the conductive or semi-conductive mixture at substantially the same level at which each electromagnetic and/or eddy current signal is transmitted, stimulating at least one corresponding reflected electromagnetic and/or eddy current signal; receiving the at least one corresponding reflected electromagnetic and/or eddy current signal; and processing the at least one reflected electromagnetic and/or eddy current signal to determine the level of at least one phase from the plurality of phases in the conductive or semi-conductive mixture within the vessel.

In some embodiments, a plurality of electromagnetic and/or eddy current signals are transmitted substantially simultaneously and the corresponding reflected electromagnetic and/or eddy current signals are received substantially simultaneously.

In some embodiments, when an electromagnetic and/or eddy current signal is transmitted by at least one antenna, the corresponding reflected electromagnetic and/or eddy current signal is received by the at least one antenna before any further electromagnetic and/or eddy current signals are transmitted by the at least one antenna.

In some embodiments the signals are of eddy current type.

In some embodiments the signals are of electromagnetic type.

In some embodiments only eddy current signals are used.

In some embodiments only electromagnetic signals are used.

In some embodiments a combination of electromagnetic and eddy current signals is used.

In some embodiments, the electromagnetic signals are in the radio frequency range.

In some embodiments, the electromagnetic signals are in the microwave frequency range.

In some embodiments, the electromagnetic signals have a frequency range of 0.5 to 3.0 GHz.

In some embodiments, the frequency of the electromagnetic signals generated by the transmitter module is constant with respect to time.

In some embodiments, the frequency of the electromagnetic signals generated by the transmitter module is variable with respect to time.

In some embodiments, the reflected electromagnetic signals are processed to determine the thickness of the vessel sidewall.

In some embodiments, the reflected electromagnetic and/or eddy current signals are processed by: determining an amount of attenuation for each of a plurality of the reflected electromagnetic and/or eddy current signals relative to the corresponding transmitted electromagnetic and/or eddy current signals; and determining at least one property of at least one phase of the conductive or semi-conductive mixture, in part from the amount of attenuation of the plurality of reflected electromagnetic and/or eddy current signals.

In some embodiments, the at least one property of the at least one phase of the conductive or semi-conductive mixture is the conductivity relative to at least one other phase of the conductive or semi-conductive mixture.

In some embodiments, the method further includes: providing a process accretion layer between the vessel sidewall and the conductive or semi-conductive mixture; transmitting a set of electromagnetic and/or eddy current signals; receiving a first set of corresponding reflected electromagnetic and/or eddy current signals originating at the interface between the vessel sidewall and the process accretion layer; receiving a second set of corresponding reflected electromagnetic and/or eddy current signals originating from the interface between the process accretion layer and the conductive or semi-conductive mixture; and processing the first and second sets of corresponding reflected electromagnetic and/or eddy current signals to determine the thickness of the process accretion layer.

In another aspect, the present invention provides a system for measuring the level of a plurality of phases of a conductive or semi-conductive mixture contained within a vessel, the vessel having a sidewall with an interior surface and an exterior surface, the system comprising: a plurality of antennas situated at a plurality of different levels along a non-conductive region of exterior surface of the vessel sidewall, wherein each antenna in the plurality of antennas is configured to transmit electromagnetic and/or eddy current signals through the sidewall of the non-conductive vessel to impinge upon at least one phase of the plurality of phases in the conductive or semi-conductive mixture within the vessel and to receive corresponding reflected electromagnetic and/or eddy current signals from at least one phase of the plurality of phases in the conductive or semi-conductive mixture; a transmitter module, the transmitter module is in communication with at least one antenna in the plurality of antennas, generates the electromagnetic and/or eddy current signals and sends the electromagnetic and/or eddy current signals to the at least one antenna; a receiver module, the receiver module is in communication with at least one antenna in the plurality of antennas and receives the reflected electromagnetic and/or eddy current signals from the at least one antenna; a control module in communication with the transmitter module and the receiver module configured to control the operation of the transmitter module and the receiver module; and a signal analysis module in communication with the receiver module configured to process the reflected electromagnetic and/or eddy current signals to determine the level of at least one phase of the plurality of phases of the conductive or semi-conductive mixture within the vessel.

In some embodiments, the transmitter module comprises a single transmitter and the generated electromagnetic and/or eddy current signal is sent to at least a portion of the plurality of antennas.

In some embodiments, the transmitter module comprises a plurality of transmitters.

In some embodiments, each of the plurality of transmitters is in communication with one corresponding antenna from the plurality of antennas, and each transmitter sends an electromagnetic and/or eddy current signal to its corresponding antenna.

In some embodiments, the receiver module comprises a plurality of receivers, each of the plurality of receivers is in communication with, and receives an electromagnetic and/or eddy current signal from, a corresponding antenna from the plurality of antennas.

In some embodiments, the plurality of antennas transmit and receive electromagnetic and/or eddy current signals in the radio frequency range.

In some embodiments, the plurality of antennas to transmit and receive electromagnetic and/or eddy current signals in the microwave frequency range.

In some embodiments, the plurality of antennas transmit and receive electromagnetic and/or eddy current signals having a frequency in the range of 0.5 to 3.0 GHz.

In some embodiments, at least a portion of the plurality of antennas are arranged in an antenna array.

In some embodiments, the frequency of the electromagnetic and/or eddy current signals generated by the transmitter module is constant with respect to time.

In some embodiments, the frequency of the electromagnetic and/or eddy current signals generated by the transmitter module is variable with respect to time.

In some embodiments, the antenna array is connected to the sidewall of the vessel in a vertical orientation.

In some embodiments, the system includes a plurality of antenna arrays, each antenna array situated at a different location on the outside surface of the vessel sidewall.

In some embodiments, the system includes at least 3 antenna arrays situated around the perimeter of the vessel.

In some embodiments, the signal analysis module determines the thickness of the vessel sidewall.

In some embodiments, the signal analysis module is configured to process the reflected electromagnetic and/or eddy current signals by: determining an amount of attenuation for at least one of a plurality of the reflected electromagnetic and/or eddy current signals relative to the corresponding transmitted electromagnetic and/or eddy current signals; and determining at least one property of at least one phase of the conductive or semi-conductive mixture, at least in part from the amount of attenuation of the plurality of reflected electromagnetic and/or eddy current signals.

In some embodiments, the at least one property of the at least one phase of the conductive or semi-conductive mixture is the conductivity relative to at least one other phase of the conductive mixture.

In some embodiments, the vessel further comprises a process accretion layer between the inside surface of the vessel sidewall and the conductive or semi-conductive mixture; the transmitted electromagnetic and/or eddy current signals stimulate a first set of corresponding reflected electromagnetic and/or eddy current signals at the interface between the sidewall and the process accretion layer and a second set of corresponding reflected electromagnetic and/or eddy current signals at the interface between the process accretion layer and the conductive or semi-conductive mixture; the plurality of antennas and the receiver module receive the first and second sets of corresponding reflected electromagnetic and/or eddy current signals; and the signal analysis module determines the thickness of the process accretion layer.

In another aspect, the present invention provides a system for measuring the level of a plurality of phases of a conductive or semi-conductive mixture contained within a vessel, the vessel having a sidewall with an interior surface and an exterior surface, the system comprising: at least one antenna, wherein the antenna is adapted to transmit electromagnetic and/or eddy current signals through a non-conductive region of the sidewall of the non-conductive vessel to impinge upon the plurality of phases in the conductive or semi-conductive mixture contained within the vessel, and receive corresponding reflected signals from the plurality of phases in the conductive or semi-conductive mixture, the antenna situated adjacent to the exterior surface of the vessel sidewall; an adjustable support in communication with the control module and connected to the at least one antenna, the adjustable support displaces the at least one antenna between a first and second position relative to the exterior surface of the sidewall of the vessel in response to a control signal from the control module; a transmitter module, the transmitter module is in communication with the at least one antenna, generates electromagnetic and/or eddy current signals and sends the electromagnetic and/or eddy current signals to the at least one antenna; a receiver module, the receiver module is in communication with the at least one antenna receives the reflected electromagnetic and/or eddy current signals from the at least one antenna; a control module in communication with the transmitter module and the receiver module configured to control the operation of the transmitter module and the receiver module; and a signal analysis module in communication with the receiver module configured to process the reflected signals to determine the level of at least one phase of the plurality of phases of the conductive or semi-conductive mixture within the non-conductive vessel.

In another aspect, the present invention provides a system for measuring the level of a plurality of phases of a conductive or semi-conductive mixture, the system comprising: a vessel, the vessel comprising a sidewall with an interior surface and an exterior surface; a plurality of antennas, that are situated at a plurality of different levels along non-conductive regions of the exterior surface of the vessel sidewall, wherein each antenna in the plurality of antennas is adapted to transmit electromagnetic and/or eddy current signals through the sidewall of the non-conductive vessel to impinge upon at least one phase of the plurality of phases in the conductive or semi-conductive mixture within the vessel, and receive corresponding reflected electromagnetic and/or eddy current signals from at least one phase of the plurality of phases in the conductive or semi-conductive mixture; a transmitter module, the transmitter module is in communication with at least one antenna in the plurality of antennas, generates the electromagnetic and/or eddy current signals and sends the electromagnetic and/or eddy current signals to the at least one antenna; a receiver module, the receiver module is in communication with at least one antenna in the plurality of antennas and receives the reflected electromagnetic and/or eddy current signals from the at least one antenna; a control module in communication with the transmitter module and the receiver module configured to control the operation of the transmitter module and the receiver module; and a signal analysis module in communication with the receiver module configured to process the reflected electromagnetic and/or eddy current signals to determine the level of at least one phase of the plurality of phases of the conductive or semi-conductive mixture within the vessel.

BRIEF DESCRIPTION OF THE DRAWINGS

Various embodiments of the invention will now be described with reference to the drawings, in which.

DESCRIPTION OF EXEMPLARY EMBODIMENTS

The following description relates to a system and method for determining the height of the transition interface, or level, between two materials contained within a molten metal vessel, such as a pyrometallurgical furnace. Examples of suitable furnaces include electrical furnaces, flash furnaces, blast furnaces, slag cleaning furnaces and the like as understood by those skilled in the art. For clarity, through out the description the term "vessel" will be used to generally describe a molten metal container and is understood to include at least the examples provided above, unless expressly stated otherwise.

One example of a transition interface that can be located using the system and method described herein is the slag phase/matte phase boundary within the furnace. Another example of a transition interface is the slag phase/air boundary within the vessel. The transition interface between phases may also be described herein as the "level" or "height" of the phase. In this context, the level or height of the matte phase can be understood as the distance from the bottom of the vessel to the slag/matte interface. Similarly, the level of the slag phase can be understood as the distance from the bottom of the vessel to the air/slag interface. However, the use of these terms is in no way intended to be limiting, and it is understood that the height of the transition interface could be determined relative to any other suitable datum, including the top of the furnace, the location of a tap hole, ground level, and sea level.

Throughout the description, materials have been broadly classified based on their relative electrical conductivity into three general classes: conductive (high electrical conductivity), semi-conductive and non-conductive (very low to no electrical conductivity). The relative nature of these terms is understood by those skilled in the art, and it is understood that a non-conductive material is a material that has an electrical conductivity that is not practically useful, and that such a material will typically have a measurable conductivity or a measurably finite impedance.

Figure 1:
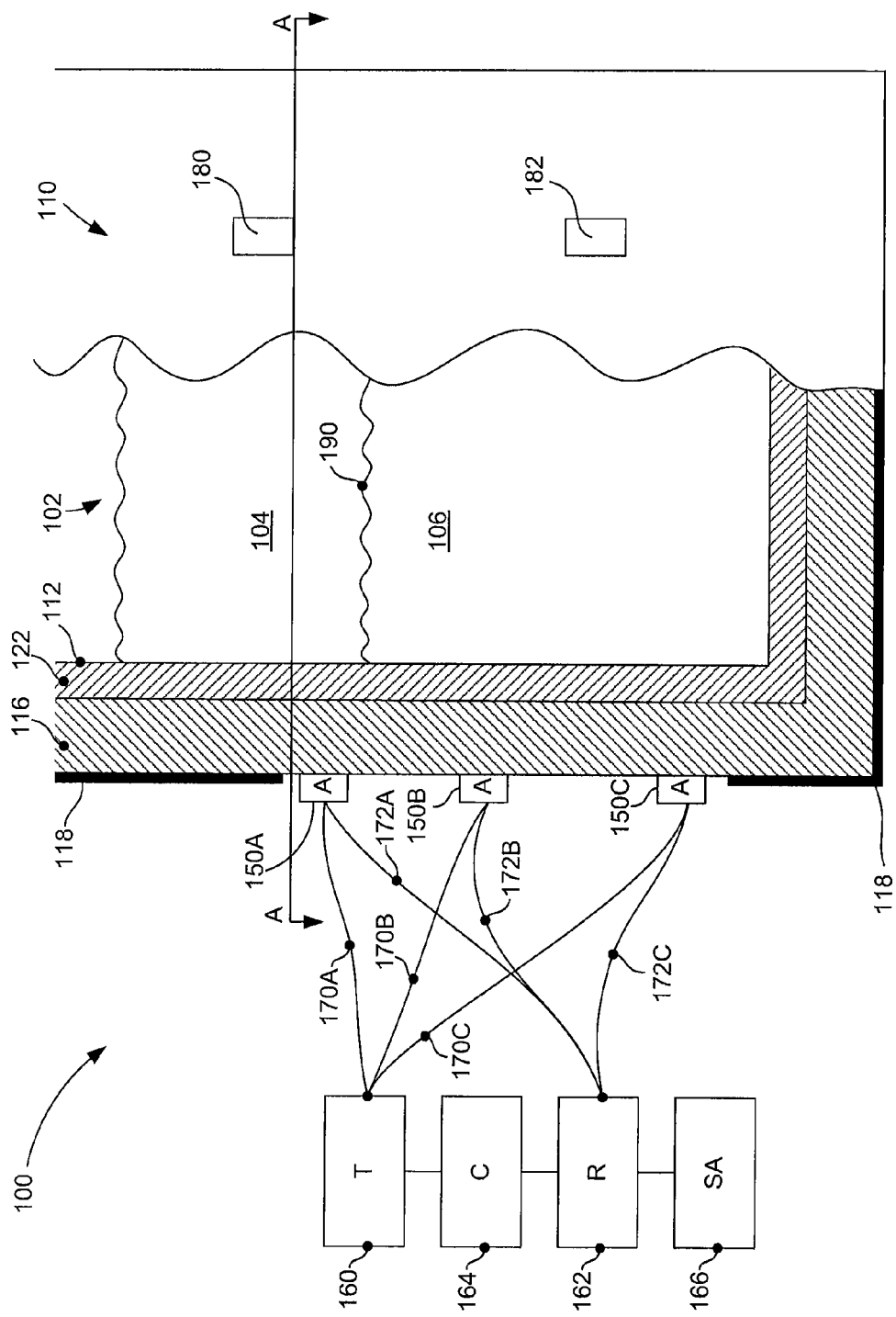
FIG. 1 is a partial section representation of an exemplary embodiment of a system for measuring the level of a plurality of phases of a conductive or semi-conductive mixture in a vessel.

Reference is first made to FIG. 1, illustrating an exemplary embodiment of a system 100 for measuring the level of at least one transition interface 190 of a conductive or semi-conductive mixture 102 contained within in a vessel 110. It is understood that the vessel 110 may be a furnace as described above.

The system 100 comprises the vessel 110, a plurality of antennas 150A, 150B, 150C, a transmitter module 160, a receiver module 162, a control module 164 and a signal analysis module 166. Each aspect of the system 100 will be explained in greater detail below.

In various embodiments, a vessel may be cooled by various cooling elements, such as waffle coolers, plate coolers, breast coolers, etc or having copper cooling tapping blocks.

In this embodiment, the vessel 110, or furnace, has an outer metal layer 118 a first refractory layer 116, a process accretion layer 122, a slag tap hole 180 and a matte tap hole 182. The vessel 110 has an interior surface 112 that is in direct contact with the conductive or semi-conductive mixture 102. For consistency, the term interior surface 112 will be used in this description to describe the inner most surface of the vessel 110, including the accretion layer 122, that is in direct contact with the mixture 102. In FIG. 1, the interior surface 112 is shown as a portion of the accretion layer 122. However, it is understood that the term interior surface 112 could describe a portion of the first, or subsequent, refractory layer 116 in embodiments of the system 100 that do not comprise a process accretion layer 122.

Outer Metal Layer

The outer metal layer 118 generally serves as an outer shell of the vessel 110. That is, the metal layer 118 may help support and contain the refractory material within the vessel 110, such as first refractory layer 116, and may serve to protect the first refractory layer 116 from external impacts or other physical damage. The outer metal layer 118 may be formed from steel, or any other metal with a suitable melting point and mechanical properties as understood by persons skilled in the art. Depending on the nature of the metal selected, the outer metal layer 118 may be conductive or semi-conductive as described above. While in some instances the outer metal layer 118 may be conductive, the remaining portions of a vessel, such as the first refractory layer 116, may be generally non-conductive.

Therefore, a vessel 110 having a conductive or semi-conductive outer metal layer 118 may have a plurality regions along its outer surface in which the outer metal layer 118 has been modified or removed to expose the underlying refractory material. These exposed regions may tend to have a conductivity that is significantly lower than the conductivity of the outer metal layer 118, and therefore may be considered non-conductive regions. Performance of the system 100 may be improved if the plurality of antennas 150A, 150B, 150C are positioned in the non-conductive regions along the surface of the vessel 110, but it is understood that the system 100 may be functional if some or all of the plurality of antennas 150A, 150B, 150C are positioned outside the non-conductive regions of the vessel 110.

It is also understood by those skilled in the art that although the vessel 110 is shown having an outer metal layer 118, some embodiments of a vessel 110 may not include a metal outer layer 118.

In some embodiments, the vessel may include copper coolers within the refractory lining. In such an embodiment, the antenna array may be installed adjacent to the hot face of the copper coolers.

First Refractory Layer

Inside the outer metal layer 118 of the vessel 100 is the first refractory layer 116. The first refractory layer 116 comprises a refractory material with a high dielectric constant, such that it is substantially transparent to the electromagnetic signals discussed below. In other words, the refractory material may be considered non-conductive. Examples of suitable refractory materials known to those skilled in the art include some oxides of magnesium or calcium, and fireclay, amongst others. A person skilled in the art will appreciate that the choice of refractory material is based upon many factors including the chemical makeup of the mixture 102, the operating temperature inside the vessel 110 and the material's transparency to the electromagnetic and/or eddy current signals, in the form of microwaves or RF (radio) or eddy current signals, for example. In general, it is preferable to avoid conductive or semi-conductive refractory materials that tend to completely or almost completely absorb the electromagnetic and/or eddy current signals such that the signals cannot be measured after travelling through the refractory material. For example, refractory materials such as graphite, semi-graphite and carbon bricks may be undesirable because, when used alone, they may substantially absorb the electromagnetic and/or eddy current signals. In some embodiments of the invention, such highly conductive refractory materials may be combined with less conductive materials through which electromagnetic and/or eddy current signals are able to travel.

When initially constructed, the vessel 110 may not comprise a process accretion layer 122 covering the inner surface of the first refractory layer 116 as shown in FIG. 1. However, during operation of the vessel 110, portions of the mixture 102 may become deposited and build-up upon the surfaces of the first refractory layer 116. This build-up is referred to as the process accretion layer 122. Because the process accretion layer 112 may be a result of the operation of the vessel 110, in some instances the process accretion layer 122 may continue to accumulate and become thicker over time.

Generally, the accretion layer 122 tends to be of a greater thickness in the slag phase 102 than in the matte phase 104. Depending on the composition of the process accretion layer 122, it may tend to be more or less conductive than the liquid portions of the mixture 102. If the process accretion layer 122 is conductive and relatively thick, it may absorb electromagnetic and/or eddy current signals of a certain frequency; therefore, in such instances a sweep frequency signal may be used, as described below.

It is understood that the system 100 described herein can be configured to operate in the absence of a process accretion layer 122, with a fixed process accretion layer 122, with a process accretion layer 122 of variable thickness along the height of the vessel 110 or with a process accretion layer 122 of varying thickness over time. Examples of such system 100 operations are included below.

Conductive or Semi-Conductive Mixture

Contained within the vessel 110 during use, and in contact with the interior surface 112, is the conductive or semi-conductive mixture 102. The mixture 102 generally comprises a plurality of phases including at least a slag phase 104 and a metal or matte phase 106. Typically, the slag phase 104 may be less dense than, and therefore buoyant relative to, the matte phase 106. This generally results in a layer of slag phase 104 floating atop the layer of matte phase 106, as shown in FIG. 1. While shown having only two phases, it is understood that the conductive or semi-conductive mixture 102 may also comprise additional phases.

During operation, the mixture 102 may be removed from the vessel 110 in a process generally referred to as tapping. Built into the walls of the vessel 110 are conduits called tap holes that can be opened to allow the molten mixture 102 to drain from the vessel 110. In the embodiment shown in FIG. 1, the vessel 110 comprises a slag tap hole 180 and a matte tap hole 182. The tapping operation is understood by those skilled in the art and will not be explained in detail.

Tap Holes

As its name suggests, the slag tap hole 180 is primarily used to drain the slag phase 104, and the matte tap hole 182 is primarily used to drain the matte phase 106 from the vessel. When either tap hole 180 or 182 is opened, any portion of the mixture 102 that is above the slag tap hole 180 may be drained from the vessel 110. In use, it may be desirable to open the slag tap hole 180 in order to remove the slag phase 104 from the mixture 102 while leaving the matte phase 106 in the vessel. Therefore, an operator may wish to open the slag tap hole 180 when the transition interface 190 is close to, but still below, the height of the slag tap hole 180. By doing so, the operator can extract the slag phase 104 without removing a significant amount of matte phase 106 from the vessel 110.

Similarly, if an operator wishes to extract only matte phase 106 from the vessel 110, she/he may wish to open the matte tap hole 182 when the transition interface 190 is well above the height of the matte tap hole 190. When the transition interface 190 approaches the level of the matte tap hole 182 the operator risks extracting a portion of the slag phase 104 via the matte tap hole 182. The operator may not wish to open the matte tap hole 182 if the level of the transition interface 190 is below the matte tap hole 182, because this would likely result in the extraction of slag phase 104 rather than matte phase 106.

Based on the tapping operations described above, it may be desirable to configure the system 100 to monitor the position of the transition interface 190 within the vessel 110. In some embodiments, it may be particularly desirable to configure the system 100 to monitor the transition interface level 190 when it approaches height of the slag tap hole 180 from below, when it approaches the matte tap hole 182 from above and when it is below the matte tap hole 182.

Antennas

To determine the height of the transition interface 190, the exemplary embodiment of the system 100 shown in FIG. 1 comprises a plurality of antennas 150A, 150B, 150C in communication with the transmitter module 160, receiver module 162, control module 164 and signal analysis module 166. The antennas 150A, 150B, 150C are operable to send and receive electromagnetic and/or eddy current signals.

The antennas 150A, 150B and 150C may be mounted on the exterior surface 114 of the vessel 110 at a plurality of different locations, as shown in FIGS. 1-3B. Alternatively, the antennas 150A, 150B and 150C may be mounted to another structure (not shown) adjacent, or in proximity to, the vessel.

In some embodiments of the system 100, the plurality of antennas 150A, 150B, and 150C may be placed along the entire height of the vessel 110. In other embodiments of the system 100, antennas 150A, 150B, and 150C may be placed along a smaller, sub-section of the vessel 110, such as the region bounded by the tap holes 180, 182. In yet another embodiment of the system 100, the antennas 150A, 150B, and 150C may be positioned to cover a section of the vessel 110 that extends from approximately the height off the slag tap hole 180 to a position that is approximately one foot below the matte tap hole 182. While three antennas 150A, 150B, and 150C are shown, it is understood that more or fewer could be used in a particular embodiment of the system 100.

The plurality of antennas 150A, 150B, and 150C transmit electromagnetic and/or eddy current signals into the interior of the vessel 110 and receive corresponding reflected, or partially reflected, electromagnetic and/or eddy current signals. Because the outer metal layer 118 may be conductive in some embodiments of the system 100, the plurality of antennas 150A, 150B, and 150C may be mounted such that the outer metal layer 118 will not block the transmission and/or reception of the electromagnetic and/or eddy current signals.

For example, in one embodiment, the outer metal layer 118 may simply be removed to form non-conductive regions in the areas where the plurality of antennas 150A, 150B, 150C are situated, as shown in FIG. 1. In this configuration, the antennas 150A, 150B and 150C may be installed directly against the first refractory layer 116 so that electromagnetic and/or eddy current signals sent from the antennas can reach the first refractory layer 116 without first having to pass through the outer metal layer 118.

Figure 3A:
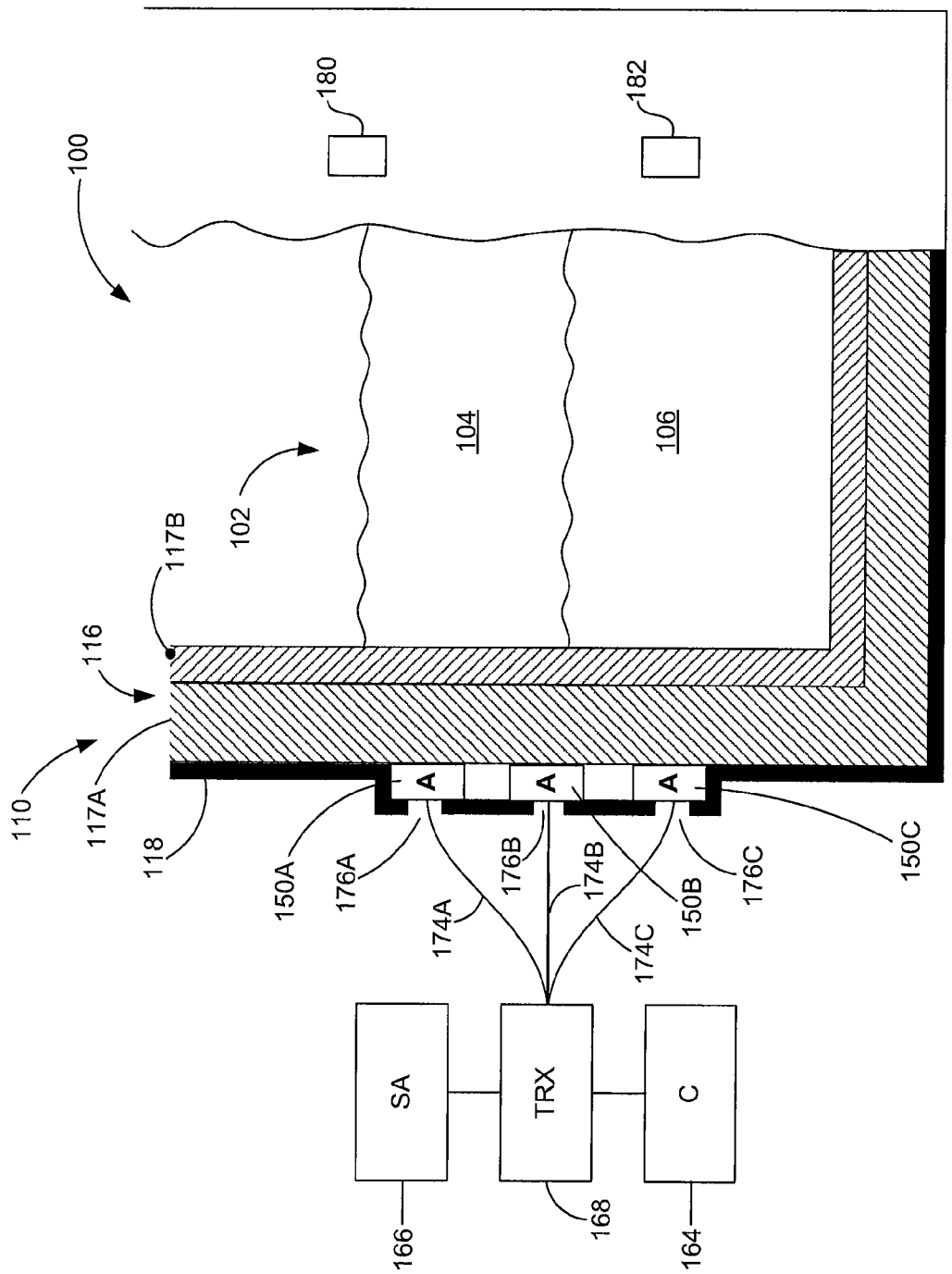
FIG. 3A is a partial section representation of another exemplary embodiment of a system for measuring the level of a plurality of phases of a conductive or semi-conductive mixture in a vessel.
Figure 3B:
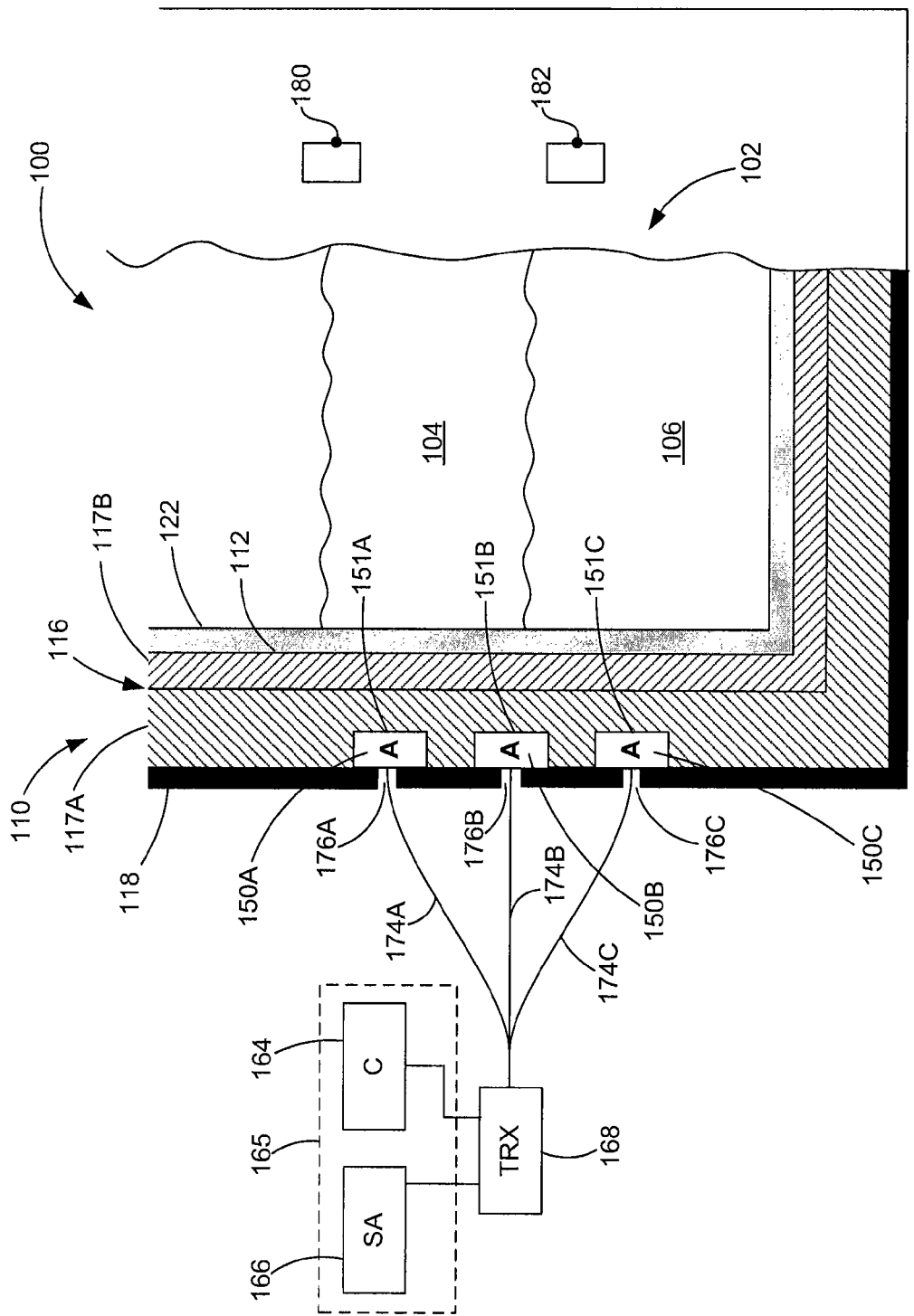
FIG. 3B is a partial section representation of another exemplary embodiment of a system for measuring the level of a plurality of phases of a conductive or semi-conductive mixture in a vessel.

In other embodiments, the outer metal layer 118 may be substantially complete and the antennas may be mounted within the metal layer 118. That is, the antennas 150A, 150B and 150C may be mounted between the outer metal layer 118 and the first refractory layer 116 and may be protected from the mixture 102 by the refractory material 116. In some embodiments, the antennas 150A, 150B and 150C may be housed within a protrusion, or bump-out, of outer metal layer 118, as shown in FIG. 3A. In another embodiment, the outer metal layer 118 may be substantially flat, and the antennas 150A, 150B and 150C may be mounted within recesses defined in the first refractory layer 116, as shown in FIG. 3B.

The antennas 150A, 150B and 150C may be installed in a variety of desired configurations. The plurality of antennas 150A, 150B and 150C in a desired configuration may be referred to as an antenna array. The system 100 may be configure to include a single antenna array, and the system may be configured to include multiple antenna arrays positioned around the perimeter of the vessel 110, as shown in FIG. 2.

Figure 2:
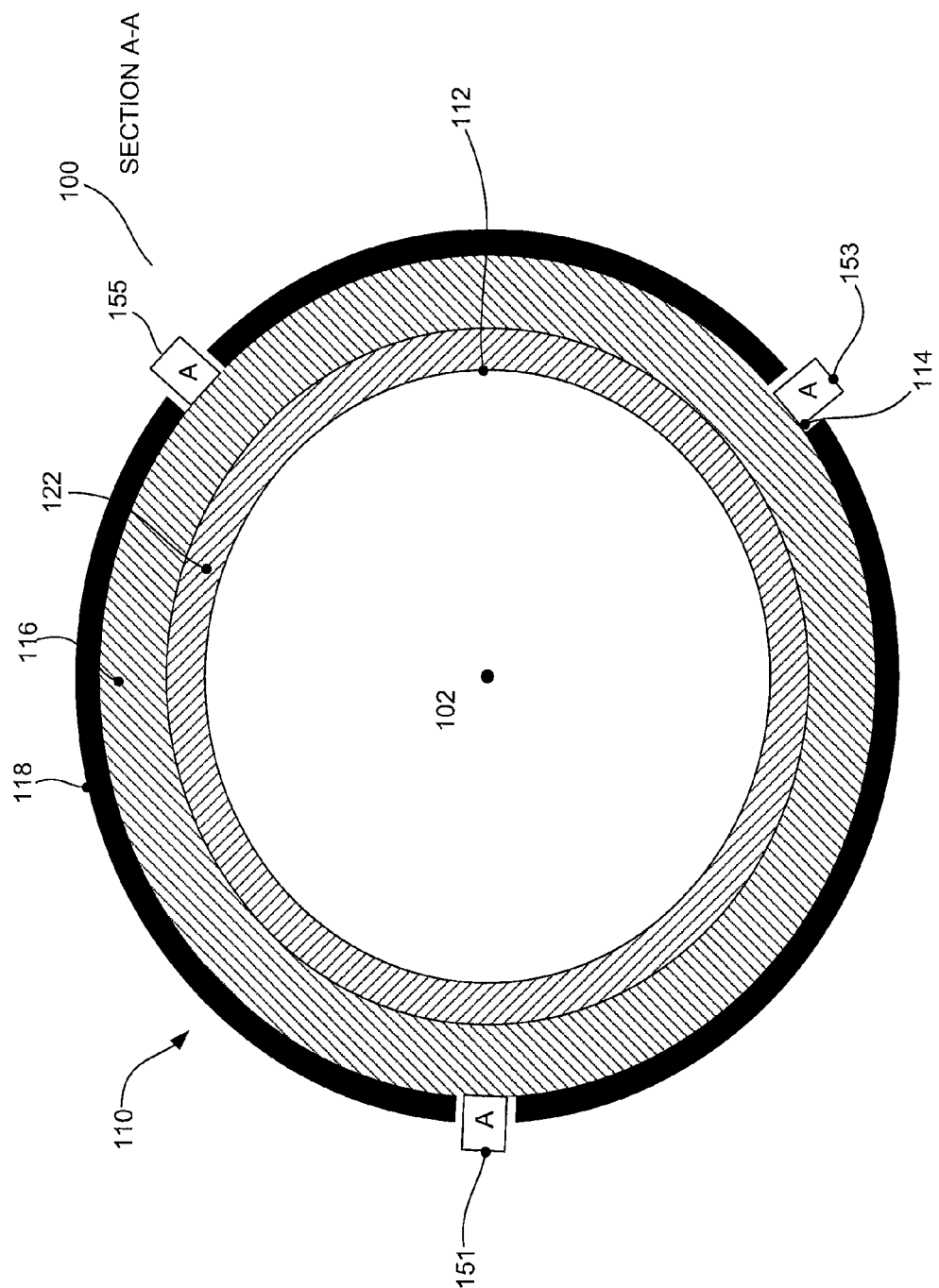
FIG. 2 is a section view taken along A-A and a horizontal cross-section of an embodiment of a system for measuring the level of a plurality of phases of a conductive or semi-conductive mixture in a vessel.

FIG. 2 shows an embodiment of the system 100 having three antenna arrays distributed with substantially equal spacing around the perimeter of a generally circular cross-section vessel 110. It is understood that the configuration shown in FIG. 2 is but one illustrative example of a configuration of the system 100, and that the system 100 could be configured using a greater or fewer antenna arrays spaced at any desired interval around the perimeter of the vessel 110. It is also understood that the vessel 110 may be of any suitable cross-sectional shape including circular, square, rectangular, triangular and the like. The operation of the system 100 may be described herein in relation to a single antenna array at times for clarity, but it is understood that the description herein equally refers to multi-antenna and multi-array configurations of the system 100.

The antennas 150A, 150B, 150C maybe any type of frequency appropriate antennas known in the art. In some embodiments the plurality of antennas 150A, 150B, 150C may comprise, for example, a plurality of quarter wavelength dipole antennas.

Transmitter Module

The transmitter module 160 may be configured to generate electromagnetic and/or eddy current signals and send the signals to the plurality of antennas 150A, 150B, 150C via communication links 170A, 170B, 170C in response to control signals from the control module 164. The electromagnetic and/or eddy current signals generated by the transmitter module 160 may be microwave signals, RF signals, eddy current signals and the like. More generally, the transmitter module 160, may be configured to produce signals in any working range specified by a system operator. One example of such an operating range includes electromagnetic signals with frequencies ranging from approximately 500 MHz (or 0.5 GHz) to approximately 3 GHz.

In one embodiment of the system 100, the transmitter module 160 may be configured to produce a signal with a fixed frequency, 1 GHz for example. In an alternative embodiment, the transmitter module 160 may produce a sweep frequency; that is, a signal having a frequency that changes with respect to time, varying between 0.5 GHz to 1 GHz for example.

The particular frequency used in the system 100 may depend on a variety of operating conditions.

In another embodiment of the system 100, the transmitter module 160 may be configured to provide each antenna 150A, 150B, 150C with identical signals. For example, the transmitter module 160 may provide each antenna 150A, 150B, 150C with a signal lasting 1 second, and having a frequency of 2.2 GHz.

However, in yet another embodiment, the transmitter module 160 may be configured to provide each antenna 150A, 150B, 150C with different signals. The signals provided to the antennas 150A, 150B, 150C may be of different magnitude, duration, frequency or any combination and sub-combination thereof. For example, the transmitter module 160 may provide antenna 150A with a signal having a frequency of 0.5 GHz, antenna 150B with a signal having a frequency of 1.5 GHz and antenna 150C with a signal having a frequency of 2.5 GHz. It is understood by those skilled in the art that any combination or sub-combination of transmitter module 160 configurations described above could be combined into a single embodiment of the system 100. Examples of some transmitter module 160 configurations are described below.

In another exemplary embodiment of system 100 the transmitter module 160 comprises a single transmitter that communicates with the plurality of antennas 150A, 150B, 150C. The transmitter module may generate a single electromagnetic and/or eddy current signal that is split prior to being sent to the plurality of antennas 150A, 150B, 150C or the transmitter module may generate separate electromagnetic and/or eddy current signals for each of the plurality of antennas 150A, 150B, 150C. In an alternative embodiment of system 100 the transmitter module comprises a plurality of transmitters, each communicating with at least one of the plurality of antennas 150A, 150B, 150C. In this configuration the transmitter module 160 may generate and send electromagnetic and/or eddy current signals to any of the plurality of antennas 150A, 150B, 150C, in any combination.

Receiver Module

The receiver module 162 may be configured to receive electromagnetic and/or eddy current signals from the plurality of antennas 150A, 150B, 150C via communications links 172A, 172B, 172C and send the received signals to a signal analysis module 166. The receiver module 162 may be configured to accept any type of signal that is generated by the transmitter module 160.

In embodiments of the system 100 that include a plurality of antenna arrays, each array may be provided with its own transmitter and receiver modules 160, 162. Alternatively, each of the plurality of antenna arrays may be connected to a common transmitter and receiver module 160, 162.

Control Module

A control module 164 may be configured to control at least the transmitter module 160 and the receiver module 162 using control signals and is communicably linked with the transmitter module 160 and the receiver module 162. The control module 164 may be configured to trigger electromagnetic and/or eddy current signals automatically, according to a user-defined schedule, or manually in response to a user command or other appropriate process trigger.

The control module 164 may be a multi-purpose computer configured with appropriate software stored in a memory and executable by a processor, or any other suitable device known in the art, including a PLC controller.

System Operation

The signal analysis module 166 is configured to analyze the received signals to determine the level of at least one transition interface 190 in the conductive or semi-conductive mixture 102. The reflected, or partially reflected, signal characteristics are used to determine which of phase of the mixture 102 is adjacent each of the plurality of antennas 150A, 150B, 150C. The level of each phase can then determined by relating the phase facing each of the plurality of antennas 150A, 150B, 150C with the known geometric relationship between the plurality of antennas 150A, 150B, 150C and the vessel 110, including the relative positions of the tap holes 180, 182.

The signal analysis module 166 may also be configured to receive and compare signals from a plurality of antenna arrays. Comparing signals received from a plurality of antenna arrays may allow for a more precise calculation of the transition interface 190 across the surface of the vessel 110, this may be referred to as a volumetric image of a transition interface 190.

When electromagnetic and/or eddy current signals are transmitted into the vessel 110 they pass through the first refractory layer 116 and the accretion layer 122 to impinge upon the conductive or semi-conductive mixture 102. The interface between the vessel 110 and the conductive or semi-conductive mixture 102 is the interior surface 112 of the vessel 110. The impinging electromagnetic and/or eddy current signals stimulate partial reflections upon reaching the each interface, creating a reflected electromagnetic and/or eddy current signal corresponding with each transmitted electromagnetic and/or eddy current signal. Electromagnetic energy that is not reflected attenuates in the conductive or semi-conductive mixture 102. The reflected electromagnetic and/or eddy current signals are collected by the plurality of antennas 150A, 150B, 150C, collected by the receiver module 164 and analyzed by the signal analysis module 166.

Differences in conductivity of the plurality of phases within the mixture 102, such as the slag phase 104 and the matte phase 106, cause differences in the amount of attenuation of the reflected electromagnetic and/or eddy current signals. By comparing the relative attenuation of a signal against known values, or against another signal, the signal analysis module 166 determines the conductivity, or relative conductivity, of the phases upon which each electromagnetic and/or eddy current signal impinges, thereby determining a transition interface 190 level profile.

For example, a matte phase 106 may have a higher conductivity than a slag phase 104 and thus, an electromagnetic signal impinging upon a matte phase 106 may tend to experience a greater amount of attenuation than an electromagnetic signal impinging upon a slag phase 104. The signal analysis module 166 then uses this difference in signal attenuation to determine which antenna(s) is adjacent the slag phase 104 and which antenna(s) is adjacent the matte phase 106. The signal analysis module 166 then uses the known geometric arrangement of the plurality of antennas 150A, 150B, 150C and the vessel 110 in combination with the amount of attenuation experienced by the reflected electromagnetic signals to construct a transition interface 190 level profile for one or more transition interfaces 190 in the conductive or semi-conductive mixture 102.

In another exemplary embodiment of system 100 the receiver module 162 comprises a single receiver that communicates with the plurality of antennas 150A, 150B, 150C and the receiver module 162 may receive signals from each of the plurality of antennas 150A, 150B, 150C.

In an alternative embodiment of system 100, the receiver module 162 comprises a plurality of receivers, each receiver communicating with one of the plurality of antennas 150A, 150B, 150C. In this configuration the receiver module 162 may receive multiple electromagnetic and/or eddy current signals simultaneously.

In some embodiments, the antennas may operate at a fixed frequency, or at two or more predetermined frequencies. In other embodiments, the transmitters may transmit a series of electromagnetic and/or eddy current signals sweeping through a frequency range.

In another exemplary embodiment of system 100 a portion of the plurality of antennas 150A, 150B, 150C are arranged in a substantially vertical stack along the exterior surface 114 of the vessel 110.

Reference is now made to FIG. 2, showing a top view of a horizontal cross-section of one embodiment of system 100. In the embodiment shown, the plurality of antennas 150A, 150B, 150C comprise a plurality of antenna arrays 151, 153, 155, each array is situated at a different location along the exterior surface 114 of the vessel 110. Preferably, at least three antenna arrays are so situated. The use of three arrays 151, 153, 155, spaced around the exterior surface 114 of the vessel 110 of generally circular cross-section allows an accurate measurement of the transition interface 190 levels between the plurality of phases in the conductive or semi-conductive mixture 102, even if the vessel is tilted or in motion or when the surface of the conductive or semi-conductive mixture 102 is not parallel to the bottom of the vessel. A person skilled in the art will appreciate that other arrangements of antenna arrays 151, 153, 155 will be appropriate to other vessel 110 geometries.

Reference is now made to FIGS. 3A and 3B showing other exemplary embodiments of system 100. FIG. 3A shows system 100 comprising a vessel 110, a plurality of antennas 150A, 150B, 150C, a transceiver module 168, a control module 164 and a signal analysis module 166.

FIG. 3B also shows system 100 comprising a vessel 110, a plurality of antennas 150A, 150B, 150C, a transceiver module 168, a control module 164 and a signal analysis module 166.

The alternative embodiment of system 100 shown in FIG. 3A shows the transmitter module 160 and the receiver module 162 implemented in combination, as a transceiver module 168. The transceiver module 168 may comprise a single transceiver in communication with the plurality of antennas 150A, 150B, 150C via bi-directional communication links 174A, 174B, 174C. Alternatively, the transceiver module 168 may comprise a plurality of transceivers, each communicating with at least one of the plurality of antennas 150A, 150B, 150C.

In FIG. 3A the refractory layer 116 of the vessel 110 comprises multiple sub-layers: a first refractory sub-layer 117A and a second refractory sub-layer 117B. The presence of multiple sub-layers 117A, 117B may be desirable as multiple sub-layers allow an operator to customize the characteristics of the vessel 110 to the particular circumstances of its use.

For example, the second refractory sub-layer 117B might be chosen primarily for its resistance to chemical reactions occurring within the conductive or semi-conductive mixture 102 while the first refractory sub-layer might be chosen primarily for properties related to heat transfer. Other sub-layers might be chosen due to low coefficients of thermal expansion or other criteria known in the art.

Also in the embodiment shown in FIG. 3A, the outer metal layer 118 is shown extending around the plurality of antennas 150A, 150B, 150C leaving small holes 176A, 176B, 176C for communications links 174A, 174B, 174C. Small holes 176A, 176B, 176C may be used because the plurality of antennas 150A, 150B, 150C are situated inside the outer metal layer 118 so that the outer metal layer 118 does not block the electromagnetic and/or eddy current signals, but large holes in the outer metal layer 118 may expose operators to risk of injury. Extending the metal layer around the plurality of antennas 150A, 150B, 150C with only small gaps 176A, 176B, 176C for communications links 174A, 174B, 174C may tend to reduce this risk.

The alternative embodiment shown in FIG. 3B shows the control module 164 and the signal analysis module 166 be integrated as a unit, for example, as software running on a computer 165. FIG. 3B also illustrates an alternative arrangement of the plurality of antennas 150A, 150B, 150C. In this arrangement, the plurality of antennas 150A, 150B, 150C are situated inside the outer metal layer 118 so that the outer metal layer 118 does not block the electromagnetic and/or eddy current signals, but, as described above, large gaps in the outer metal layer 118 surrounding the antennas 150A, 150B, 150C may expose operators to risk of injury. In this arrangement, the risk to the operators may be reduced by providing a plurality of recesses 151A, 151B, 151C in the sidewall of the vessel 110 in which to situate the plurality of antennas 150A, 150B, 150C. The outer metal layer 118 may have small holes 176A, 176B, 176C to allow communications links 174A, 174B, 174C to pass through.

Also illustrated in FIG. 3B is a process accretion layer 122 adjacent the interior surface of the vessel 110. The process accretion layer 122 can form with use of the vessel 110 over time, as described above.

Figure 4:
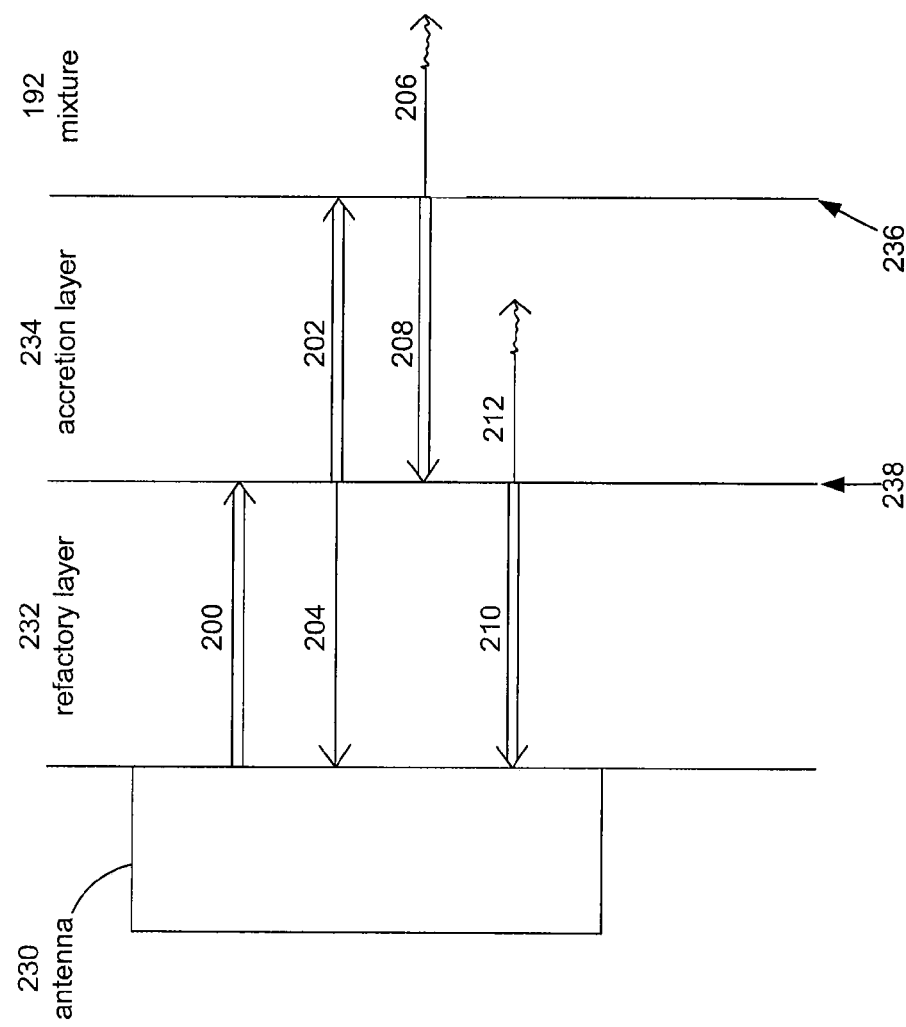
FIG. 4 is a schematic representation of the path of an electromagnetic and/or eddy current signal.

Reference is now made to FIG. 4 showing a schematic representation of the path of an electromagnetic and/or eddy current signal from the an antenna 230, through a refractory layer 232 and a process accretion layer 234 to the mixture boundary 236 and back. The operation of antenna 230 is representative of the antennas 150A, 150B, 150C described above.

Initially, an electromagnetic signal 200 is transmitted from an antenna 230 into the refractory layer 232. Upon reaching the boundary 238 between the refractory layer 232 and the process accretion layer 234, a portion 202 of the electromagnetic and/or eddy current signal 200 is transmitted through the boundary 238 while a portion 204 is reflected. The reflected portion 204 returns to the antenna and is received. The transmitted portion 202 continues through the process accretion layer 234 until it reaches the mixture boundary 236. Upon reaching the mixture boundary 236, a portion 206 of the signal is transmitted through the boundary 236 while a portion 208 is reflected. The transmitted portion 206 continues into the conductive or semi-conductive mixture 102 and attenuates. The reflected portion proceeds back through the process accretion layer 234 to the boundary 238 between the process accretion layer 234 and the refractory layer 232 where again, a portion 210 is transmitted through the boundary 238 while a portion 212 is reflected. The reflected portion 212 attenuates. The transmitted portion 210 proceeds through the refractory layer 232 and is received at the antenna 230.

The signal analysis module 166 uses reflected electromagnetic and/or eddy current signals 204 and 210 to extract information regarding the thickness of the refractory layer 232, the thickness of the process accretion layer 234 and the conductivity of the phase of the mixture 102 upon which the electromagnetic and/or eddy current signal impinged. Analyzing the received electromagnetic and/or eddy current signals 204, 210 in the frequency domain can lead to determining the thickness of the refractory layer 232 and the process accretion layer 234. The amount of attenuation experienced by the received electromagnetic and/or eddy current signal 210 relative to the transmitted electromagnetic and/or eddy current signal 200, in combination with the same measurement repeated at other antennas, can be used to determine the transition interface 190 level profile of the plurality of phases in the conductive or semi-conductive mixture 102.

For example, the reflected signals 204, 210 will echo back from the process accretion layer 234 accretion or/and the molten mixture 102. If multiple signals 200 are transmitted from the antenna 230 over a data collection period of a predetermined time, the reflection, or echo, will also happen several times for the period of data collection and gathering. Because the interface between the antenna 230 and the mixture 102 remains substantially constant during the collection period, an accumulated signal, based on the reflected signals 204, 210, may be a resonance that is produced based on the thickness of the refractory layer 232, and the known electromagnetic and/or eddy current signal speed for the refractory layer 232.

Therefore, the thickness of the refractory layer 232 can be calculated based on the peak frequency amplitude of the reflected signals 204, 210 that is generated taking a fast Fourier Transform (FFT) of the time-domain signal.

In addition, using the same reflected signal 210, the composition of the mixture 102 can be determined. Due to its generally highly metallic composition, the matte phase 106 of the mixture 102 tends to be more conductive than the slag phase 104 of the mixture 102. As a function of its higher conductivity, the matte phase 106 tends to absorb and attenuate electromagnetic and/or eddy current signals more than the relatively lower conductivity slag phase 104.

Therefore, a known signal 200 is transmitted from a plurality of antennas 230 positioned a various heights along the surface of a vessel 110, the amplitude of the reflected signals 210 may be compared to determine the phase of the mixture 102 encountered by each signal 200. In other words, if a reflected signal 210 has a relatively high amplitude, signal strength and energy; the reflected signal 210 is likely being reflected by the slag phase 104 of the mixture 102. In comparison, if the reflected signal 210 has a relatively low energy, low amplitude and low strength signal, more of the signal has been absorbed/attenuated so the signal 210 is likely being reflected by the matte phase 106 of the mixture 102.

Figure 5:
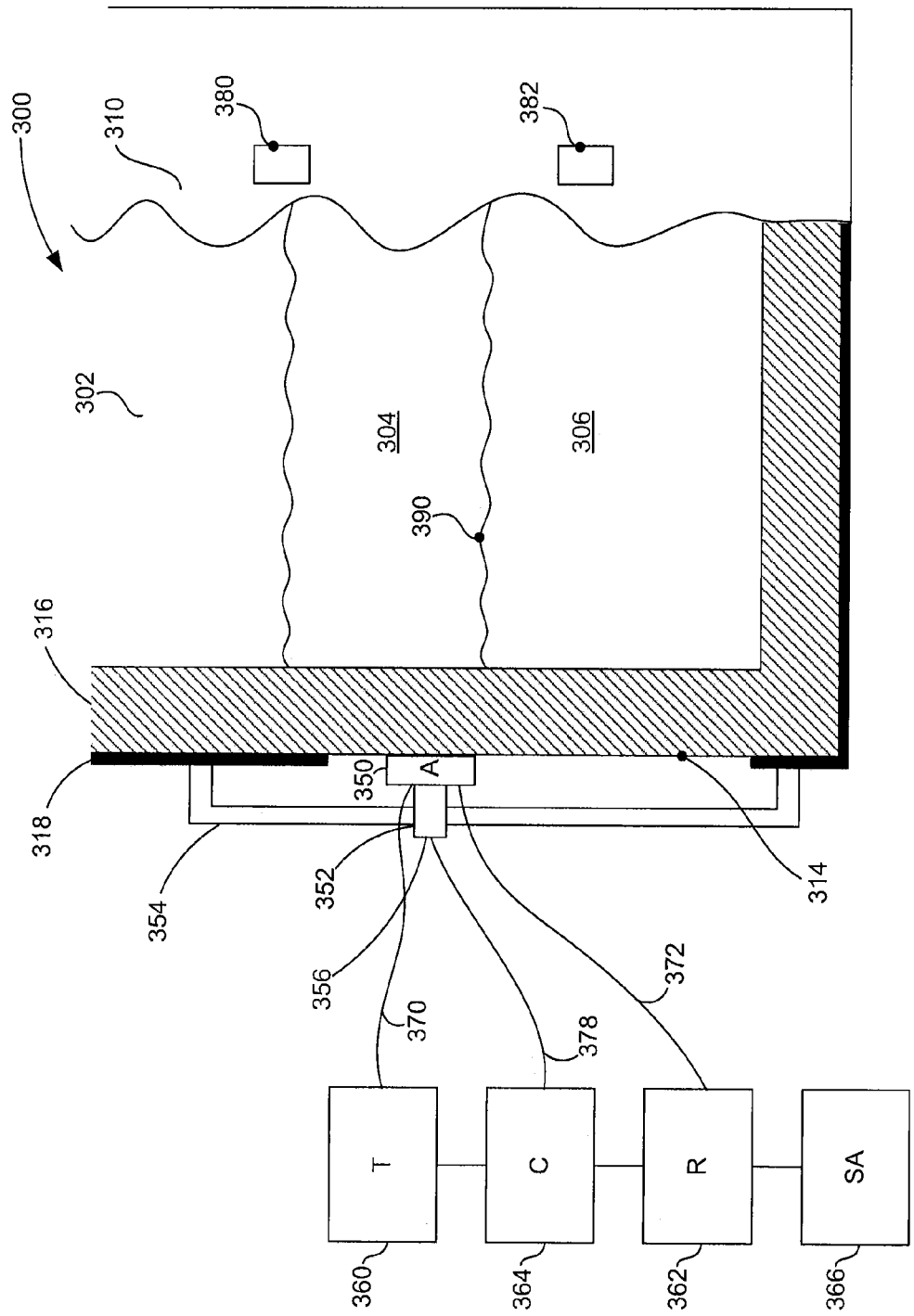
FIG. 5 is a partial section representation of another exemplary embodiment of a system for measuring the level of a plurality of phases of a conductive or semi-conductive mixture in a vessel.

Reference is now made to FIG. 5 illustrating an exemplary embodiment of a system 300 for measuring the transition interface 390 level of a plurality of phases 304, 306 of a conductive or semi-conductive mixture 302 in a vessel 310. The system 300 comprises a vessel 310, an antenna 350, adjustable support 356, a transmitter module 360, a receiver module 362, a control module 364 and a signal analysis module 366. A person skilled in the art will appreciate that any variants described above with respect to system 100 can be applied in an analogous manner to system 300. In addition, while the embodiment of the system 300 comprising the adjustable support 356 is illustrated having one antenna 350, it is understood that the adjustable support could be configured to move more than one antenna.

The vessel 310, containing a conductive or semi-conductive mixture 302, is shown with only a single refractory layer 316 and an outer metal layer 318 for simplicity of illustration, but the structure of the vessel 310 may be more complex, as described above. Similarly, any embodiments of the system 100 described above may be implemented on a vessel 310 comprising only a single refractory layer 316. The transmitter module 360, receiver module 362 and signal analysis module 366 function in a like manner to their respective analogues, and variations thereof, in system 100. The vessel 310 may also comprise a slag tap hole 380 and a matte tap hole 382.

The antenna 350 may be situated adjacent to the exterior surface 314 of the vessel 310 but is attached to adjustable support 352.

Adjustable Support

Adjustable support 352 may be by any means capable of controllably moving the antenna 350 along the exterior surface 314 of the vessel 310 in response to a control signal.

For example, adjustable support 352 may comprise a rail 354, attached to the vessel 310 and an actuator 356, attached to the antenna 350, wherein the actuator 356 moves along the rail 354, thus displacing the antenna 350 along the exterior surface 314 of the vessel 310. Examples of the rail 354 include cylindrical or rectangular bars or hollow tubes and the like. Examples of an actuator 356 include a hydraulic actuator, a pneumatic actuator, a mechanical actuator, an electromechanical actuator and the like or any combination thereof.

While the adjustable support 352 is illustrated as being attached to the outer metal surface 318 of the vessel 310, it is understood that the adjustable support 352 need not to be connected directly to the vessel 310, but may instead be connected to the another object, such as the ground, ceiling or a neighboring support structure (not shown). In addition, in some embodiments of the system 300, the support for the adjustable support 352 may be portable, so that a single antenna 350 could be used in combination with a plurality of vessels 310 in sequence.

In some embodiments of the system 300, the adjustable support 352 is configured to operate along substantially the entire height of the vessel 310. In other embodiments, the adjustable support 352 is configured to only operate along a sub-section of height of the vessel 310, for example the region bounded by the slag tap hole 380 and the bottom of the vessel. In yet another embodiment, the adjustable support 352 is configured to operate from approximately the height of the slag tap hole 380 to approximately one foot below the matte tap hole 382.

The controllable movement of the adjustable support 352 may comprise intermittent motion of the antenna 350, continuous motion of the antenna 350 or any combination thereof.

The control module 364 may be configured to control at least the transmitter module 360, the receiver module 362 and the adjustable support 352 using control signals and may communicate with the transmitter module 360, the receiver module 362 and the adjustable support 352 via communication links 370, 372 and 378 respectively.

In one embodiment of system 300, the transition interface 390 level profile of the plurality of phases of the conductive or semi-conductive mixture 302 is determined from a plurality of measurements taken in sequence by the antenna 350 at a plurality of discrete vertical positions along the exterior surface 314 of the vessel 310. That is, the process of moving the antenna 350 into position, transmitting a signal and receiving a reflected signal is repeated sequentially until the transition interface 390 level profile has been generated by the signal analysis module 366.

In an alternative embodiment of system 300, the level profile of the plurality of phases of the conductive or semi-conductive mixture 302 is determined from a plurality of measurements taken by the antenna 350 as the adjustable support 352 continuously displaces the antenna 350 along the exterior surface 314 of the vessel 310. That is, antenna 350 motion is continuous and signal transmission and reception occur while the antenna 350 is moving.

In yet another embodiment of the system 300, a portion of the measurements may be taken using discrete signals generated when the antenna 350 is in discrete vertical positions, and a portion of the measurements may be taken using repeated, or continuous signals, generated while the antenna 350 is continuously moving.

Figure 6:
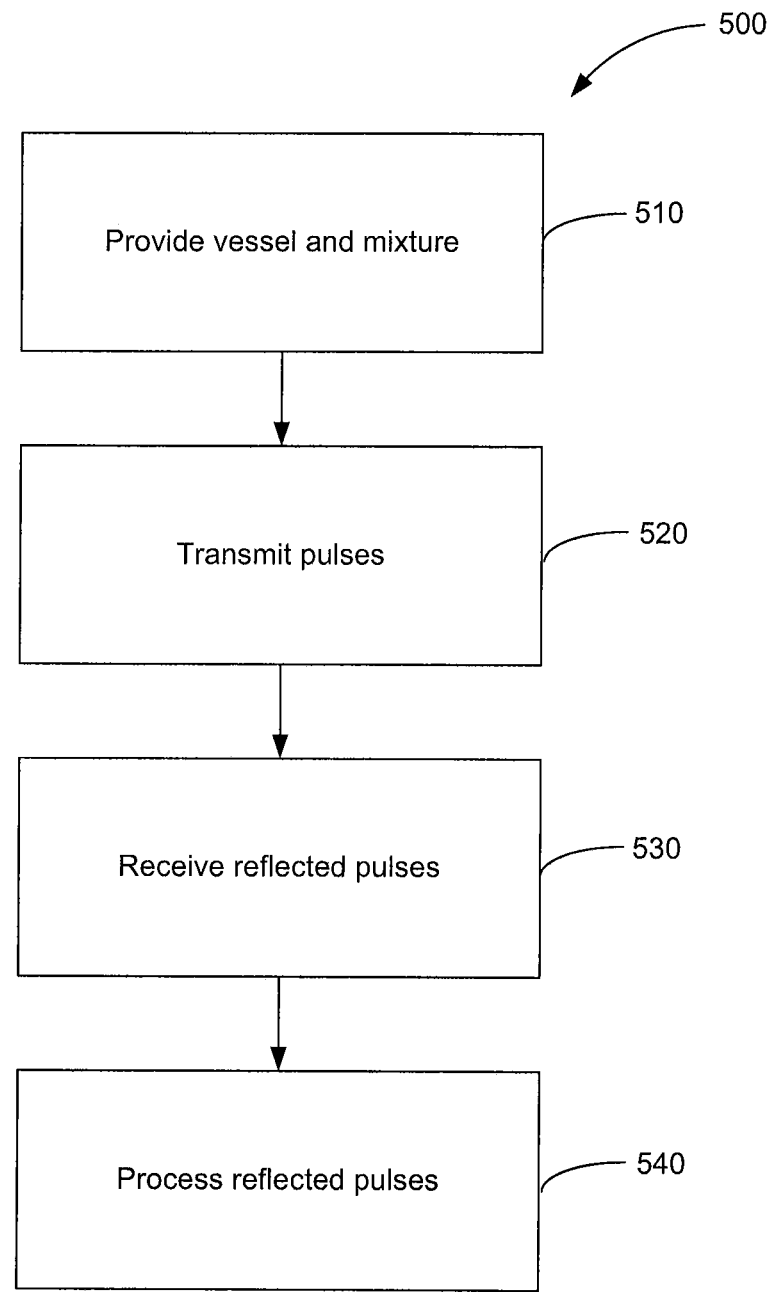
FIG. 6 is a flowchart of an exemplary method for measuring the level of a plurality of phases of a conductive or semi-conductive mixture in a vessel.

Reference is now made to FIG. 6, showing a flowchart of an exemplary method 500 of measuring the level of a plurality of phases of a conductive or semi-conductive mixture in a vessel. The method comprises providing a vessel containing a conductive or semi-conductive mixture with a plurality of phases 510, transmitting electromagnetic signals 520, receiving reflected electromagnetic signals 530 and processing the reflected electromagnetic and/or eddy current signals 540.

For clarity, it is understood that the level could be the transition interface 190 or 390; the vessel could be vessel 110 or 310; the mixture could be mixture 102 or 302; and the phases could be the slag phase 104 and the matte phase 106 as described above. However, these examples are provided for clarity only, and do not limit the application of method 500 to any particular embodiments of the system described herein.

At the first step 510, a vessel containing a conductive or semi-conductive mixture with a plurality of phases is provided, the vessel comprising a refractory layer.

The second step 520 is to transmit electromagnetic and/or eddy current signals into the vessel. The signals are transmitted at a plurality of different levels. Each signal enters the vessel, travels through it and impinges upon the conductive or semi-conductive mixture at substantially the same level as it was transmitted; stimulating corresponding reflected, or partially reflected, electromagnetic and/or eddy current signals.

The third step 530 is receiving each of the reflected electromagnetic and/or eddy current signals.

The fourth step 540 is processing the reflected electromagnetic and/or eddy current signals to construct a level profile of the plurality of phases in the conductive or semi-conductive mixture. The processing may comprise determining the amount of attenuation of each of the reflected electromagnetic and/or eddy current signals relative to the corresponding transmitted electromagnetic and/or eddy current signals, comparing the amount of attenuation experienced by each reflected electromagnetic and/or eddy current signal and determining there from at least one property of at least one phase of the conductive or semi-conductive mixture.

For example, the amount of attenuation may allow the determination of the relative conductivity of each of the plurality of phases in the conductive or semi-conductive mixture. The conductivity of a matte phase may be generally greater than the conductivity of a slag phase. Accordingly, an electromagnetic signal reflected from a matte phase may experience a greater amount of attenuation than an electromagnetic signal reflected from a slag phase. Thus, if an electromagnetic signal reflected from a first phase at a first level experiences a first amount of attenuation and an electromagnetic signal reflected from a second phase at a second level experiences a second, greater, amount of attenuation then the phase at the first level has a lower conductivity than the phase at the second level. Accordingly, if the only two phases present are a slag phase and a matte phase then the first phase at the first level corresponds to the slag phase and the second phase at the second level corresponds to the matte phase.

Further, the reflected electromagnetic and/or eddy current signals may be used to determine the thickness of the refractory layer in the vessel by measuring the time required for the electromagnetic signals to be reflected by the conductive or semi-conductive mixture and return.

In another embodiment of method 500 the electromagnetic signals are in the radio frequency range. In an alternative embodiment of method 500 the electromagnetic signals are in the microwave frequency range of 0.5 GHz to 3.0 GHz. Preferably, the electromagnetic signals are in the range of 0.5 GHz to 1.0 GHz.

In another embodiment of method 500, the first step 510 may further comprise providing a process accretion layer along the interior surface of the vessel. In addition, the third step 530 may comprise receiving a first and second set of reflected electromagnetic signals: the first set of reflected electromagnetic signals being partial reflections of the transmitted electromagnetic signals from the boundary between the refractory layer and the process accretion layer and the second set of reflected electromagnetic signals being partial reflections of the transmitted electromagnetic signals from the boundary of the process accretion layer and the conductive or semi-conductive mixture.

In a further embodiment of method 500, the fourth step 540 may comprise determining the thickness of the refractory layer and the process accretion layer as well as the level profile of the plurality of phases in the conductive or semi-conductive mixture. An analysis of the first set of reflected electromagnetic and/or eddy current signals and the second set of reflected electromagnetic and/or eddy current signals in the frequency domain may be used to determine the thickness of the refractory layer and the process accretion layer. The amount of attenuation of the second set of reflected electromagnetic and/or eddy current signals from the time domain signal analysis can be used to determine from which of the plurality of phases each electromagnetic and/or eddy current signal was reflected. Thus, by processing the first and second set of reflected electromagnetic and/or eddy current signals the thickness of the refractory layer and the process accretion layer as well as the level profile of the plurality of phases in the conductive or semi-conductive mixture can be determined.

Figure 7:
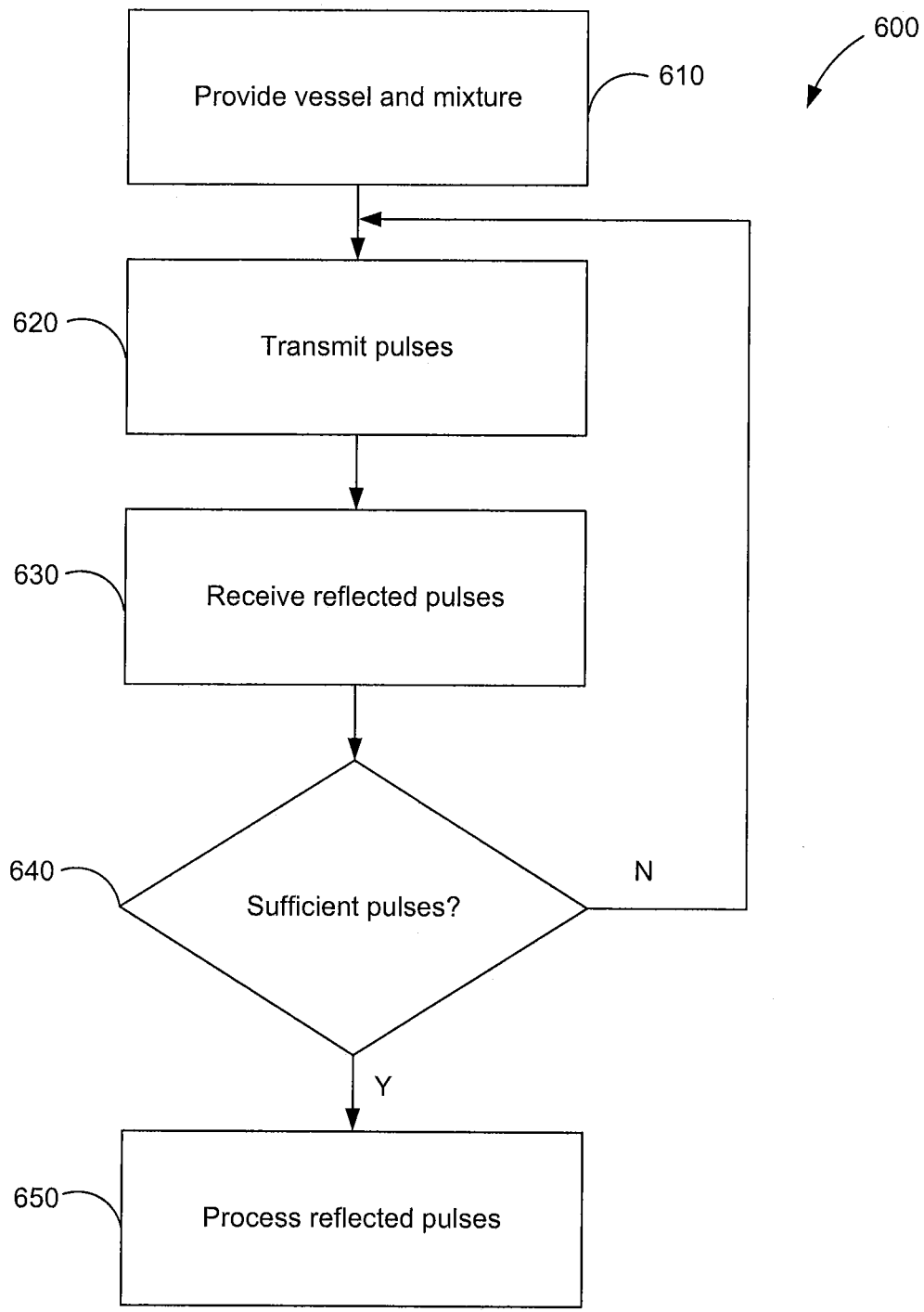
FIG. 7 is a flowchart of an exemplary method for measuring the level of a plurality of phases of a conductive or semi-conductive mixture in a vessel.

Reference is now made to FIG. 7, showing a flowchart of an exemplary method 600 of measuring the level of a plurality of phases of a conductive or semi-conductive mixture in a vessel. The method comprises providing a vessel containing a conductive or semi-conductive mixture with a plurality of phases 610, transmitting electromagnetic and/or eddy current signals 620, receiving a corresponding reflected electromagnetic and/or eddy current signal 630, determining if sufficient electromagnetic and/or eddy current signals have been received 640 and analyzing the reflected electromagnetic and/or eddy current signals 650.

At the first step 610, a vessel containing a conductive or semi-conductive mixture with a plurality of phases is provided, the vessel comprising a refractory layer. The vessel and the conductive or semi-conductive mixture may be the vessels and mixtures described above in connection with FIGS. 1 to 5.

The second step 620 is to transmit an electromagnetic and/or eddy current signal into the vessel. The signal is transmitted at one of a plurality of different levels. The signal enters the vessel, travels through it and impinges upon the conductive or semi-conductive mixture at substantially the same level as it was transmitted; stimulating a corresponding reflected electromagnetic and/or eddy current signal.

The third step 630 is receiving the reflected electromagnetic and/or eddy current signal.

The fourth step 640 is determining whether sufficient reflected electromagnetic and/or eddy current signals have been received to construct the level profile of the plurality of phases in the conductive or semi-conductive mixture. If sufficient reflected electromagnetic and/or eddy current signals have been received then the method 600 proceeds to the fifth step 650. If insufficient reflected electromagnetic and/or eddy current signals have been received then the method returns to the second step 620 and an additional electromagnetic and/or eddy current signal is transmitted.

The fifth step 650 is processing the reflected electromagnetic and/or eddy current signals to construct a level profile of the plurality of phases in the conductive or semi-conductive mixture. The processing may be effected in the same manner described above in connection with FIG. 6.

The method 600 may also be applied in a situation where a process accretion layer is provided in a manner similar to what is described above in connection with FIG. 6.

The present invention has been described here by way of example only. Various modifications and variations may be made to these exemplary embodiments without departing from the spirit and scope of the invention, which is limited only by the appended claims.

We claim:

1. A method of measuring the level of a phase from a plurality of phases of a conductive or semi-conductive mixture within a vessel, the method comprising:
    providing a vessel containing a conductive or semi-conductive mixture including a plurality of phases, the vessel comprising a sidewall;
    providing a refractory layer between the vessel sidewall and the conductive or semi-conductive mixture;
    transmitting at least one electromagnetic and/or eddy current signal into the vessel sidewall at a plurality of different levels so that each of the transmitted electromagnetic and/or eddy current signals impinges upon the conductive or semi-conductive mixture at substantially the same level at which each electromagnetic and/or eddy current signal is transmitted stimulating at least one corresponding reflected electromagnetic and/or eddy current signal;
    receiving the at least one corresponding reflected electromagnetic and/or eddy current signal, the reflected electromagnetic and/or eddy current signal originating at the interface between the vessel sidewall and the refractory layer or at the interface between the refractory layer and the conductive or semi-conductive mixture or at the interface of a process accretion layer formed on interior surface of the refractory layer and the conductive or semi-conductive mixture; and
    processing the at least one reflected electromagnetic and/or eddy current signal to determine the level of at least one phase from the plurality of phases in the conductive or semi-conductive mixture and the thickness of either the refractory layer or the process accretion layer or both.

2. The method of claim 1 wherein a plurality of electromagnetic and/or eddy current signals are transmitted substantially simultaneously and the corresponding reflected electromagnetic and/or eddy current signals are received substantially simultaneously.

3. The method of claim 1 wherein, when an electromagnetic and/or eddy current signal is transmitted by at least one antenna, the corresponding reflected electromagnetic and/or eddy current signal is received by the at least one antenna before any further electromagnetic and/or eddy current signals are transmitted by the at least one antenna.

4. The method of claim 1 wherein the electromagnetic signals are in the radio frequency range.

5. The method of claim 1 wherein the electromagnetic signals are in the microwave frequency range.

6. The method of claim 1 wherein the electromagnetic signals have a frequency range of 0.5 to 3.0 GHz.

7. The method of claim 1 wherein the frequency of the electromagnetic and/or eddy current signals generated by the transmitter module is constant with respect to time.

8. The method of claim 1 wherein the frequency of the electromagnetic and/or eddy current signals generated by the transmitter module is variable with respect to time.

9. The method of claim 1 wherein the reflected electromagnetic and/or eddy current signals are processed by:
    determining an amount of attenuation for each of a plurality of the reflected electromagnetic and/or eddy current signals relative to the corresponding transmitted electromagnetic and/or eddy current signals; and
    determining at least one property of at least one phase of the conductive or semi-conductive mixture, in part from the amount of attenuation of the plurality of reflected electromagnetic and/or eddy current signals.

10. The method of claim 9 wherein the at least one property of the at least one phase of the conductive or semi-conductive mixture is the conductivity relative to at least one other phase of the conductive or semi-conductive mixture.

11. A system for measuring the level of a plurality of phases of a conductive or semi-conductive mixture contained within a vessel, the vessel having a sidewall with an exterior surface and a refractory layer between the sidewall and the conductive or semi-conductive mixture, the system comprising:
    a plurality of antennas, wherein:
        the antennas are situated at a plurality of different levels along a non-conductive region of exterior surface of the vessel sidewall;
        each antenna in the plurality of antennas is configured:
            to transmit electromagnetic and/or eddy current signals through the sidewall of the non-conductive vessel to impinge upon at least one phase of the plurality of phases in the conductive or semi-conductive mixture within the vessel; and
            to receive corresponding reflected electromagnetic and/or eddy current signals, the reflected electromagnetic and/or eddy current signals originating at the interface between the sidewall and the refractory layer or at the interface between the refractory layer and the conductive or semi-conductive mixture or at the interface of a process accretion layer formed on interior surface of the refractory layer and the conductive or semi-conductive mixture;
    a transmitter module, the transmitter module is in communication with at least one antenna in the plurality of antennas, generates the electromagnetic and/or eddy current signals and sends the electromagnetic and/or eddy current signals to the at least one antenna;
    a receiver module, the receiver module is in communication with at least one antenna in the plurality of antennas and receives the reflected electromagnetic and/or eddy current signals from the at least one antenna;
    a control module in communication with the transmitter module and the receiver module configured to control the operation of the transmitter module and the receiver module; and
    a signal analysis module in communication with the receiver module configured to process the reflected electromagnetic and/or eddy current signals to determine the level of at least one phase from the plurality of phases in the conductive or semi-conductive mixture and the thickness of either the refractory layer or the process accretion layer or both.

12. The system of claim 11 wherein the transmitter module comprises a single transmitter and the generated electromagnetic and/or eddy current signal is sent to at least a portion of the plurality of antennas.

13. The system of claim 11 wherein the transmitter module comprises a plurality of transmitters.

14. The system of claim 13 wherein each of the plurality of transmitters is in communication with one corresponding antenna from the plurality of antennas, and each transmitter sends an electromagnetic and/or eddy current signal to its corresponding antenna.

15. The system of claim 11 wherein the receiver module comprises a plurality of receivers, each of the plurality of receivers is in communication with, and receives an electromagnetic and/or eddy current signal from, a corresponding antenna from the plurality of antennas.

16. The system of claim 11 wherein the plurality of antennas transmit and receive electromagnetic and/or eddy current signals in the radio frequency range.

17. The system of claim 11 wherein the plurality of antennas to transmit and receive electromagnetic and/or eddy current signals in the microwave frequency range.

18. The system of claim 11 wherein the plurality of antennas transmit and receive electromagnetic signals having a frequency in the range of 0.5 to 3.0 GHz.

19. The system of claim 11 wherein at least a portion of the plurality of antennas are arranged in an antenna array.

20. The system of claim 19 wherein, the antenna array is connected to the sidewall of the vessel in a substantially vertical orientation.

21. The system of claim 20 comprising a plurality of antenna arrays, each antenna array situated at a different location on the exterior surface of the vessel.

22. The system of claim 21 comprising at least 3 antenna arrays situated around the perimeter of the vessel.

23. The system of claim 11 wherein the frequency of the electromagnetic and/or eddy current signals generated by the transmitter module is constant with respect to time.

24. The system of claim 11 wherein the frequency of the electromagnetic and/or eddy current signals generated by the transmitter module is variable with respect to time.

25. The system of claim 11 wherein the signal analysis module is further configured to process the reflected electromagnetic and/or eddy current signals by:
determining an amount of attenuation for at least one of a plurality of the reflected electromagnetic and/or eddy current signals relative to the corresponding transmitted electromagnetic and/or eddy current signals; and
determining at least one property of at least one phase of the conductive or semi-conductive mixture, at least in part from the amount of attenuation of the plurality of reflected electromagnetic and/or eddy current signals.

26. The system of claim 25 wherein the at least one property of the at least one phase of the conductive or semi-conductive mixture is the conductivity relative to at least one other phase of the conductive mixture.

27. A system for measuring the level of a plurality of phases of a conductive or semi-conductive mixture contained within a vessel, the vessel having a sidewall with an exterior surface and a refractory layer between the sidewall and the conductive or semi-conductive mixture, the system comprising:
at least one antenna situated adjacent to the exterior surface of the vessel sidewall, wherein the antenna is adapted to:
transmit electromagnetic and/or eddy current signals through a non-conductive region of the sidewall of the non-conductive vessel to impinge upon the plurality of phases in the conductive or semi-conductive mixture contained within the vessel; and
receive corresponding reflected signals, the reflected signals originating at the interface between the sidewall and the refractory layer or at the interface between the refractory layer and at least one phase from the plurality of phases in the conductive or semi-conductive mixture or at the interface of a process accretion layer formed on interior surface of the refractory layer and at least one phase from the plurality of phases in the conductive or semi-conductive mixture;
an adjustable support in communication with the control module and connected to the at least one antenna, the adjustable support displaces the at least one antenna between a first and second position relative to the exterior surface of the sidewall of the vessel in response to a control signal from the control module;
a transmitter module, the transmitter module is in communication with the at least one antenna, generates electromagnetic and/or eddy current signals and sends the electromagnetic and/or eddy current signals to the at least one antenna;
a receiver module, the receiver module is in communication with the at least one antenna and receives the reflected electromagnetic and/or eddy current signals from the at least one antenna;
a control module in communication with the transmitter module and the receiver module configured to control the operation of the transmitter module and the receiver module; and
a signal analysis module in communication with the receiver module configured to process the reflected signals to determine the level of at least one phase from the plurality of phases in the conductive or semi-conductive mixture and the thickness of either the refractory layer or the process accretion layer or both.

28. A system for measuring the level of a plurality of phases of a conductive or semi-conductive mixture, the system comprising:
a vessel, the vessel comprising a sidewall with an exterior surface and a refractory layer between the sidewall and the conductive or semi-conductive mixture;
a plurality of antennas, wherein:
the antennas are situated at a plurality of different levels along non-conductive regions of the exterior surface of the vessel sidewall;
each antenna in the plurality of antennas, wherein each antenna is adapted to:
transmit electromagnetic and/or eddy current signals through the sidewall of the non-conductive vessel to impinge upon at least one phase of the plurality of phases in the conductive or semi-conductive mixture within the vessel; and
receive corresponding reflected electromagnetic and/or eddy current signals, the reflected electromagnetic and/or eddy current signals originating at the interface between the sidewall and the refractory layer or at the interface between the refractory layer and at least one phase from the plurality of phases in the conductive or semi-conductive mixture or at the interface of a process accretion layer formed on interior surface of the refractory layer and at least one phase from the plurality of phases in the conductive or semi-conductive mixture a transmitter module, the transmitter module is in communication with at least one antenna in the plurality of antennas, generates the electromagnetic and/or eddy current signals and sends the electromagnetic and/or eddy current signals to the at least one antenna;

a receiver module, the receiver module is in communication with at least one antenna in the plurality of antennas and receives the reflected electromagnetic and/or eddy current signals from the at least one antenna;

a control module in communication with the transmitter module and the receiver module configured to control the operation of the transmitter module and the receiver module; and a signal analysis module in communication with the receiver module configured to process the reflected electromagnetic and/or eddy current signals to determine the level of at least one phase from the plurality of phases in the conductive or semi-conductive mixture and the thickness of either the refractory layer or the process accretion layer or both.

* * * * *